No. 742,935. PATENTED NOV. 3, 1903.
P. E. WARD & S. HARRIS.
ACETYLENE GAS GENERATOR.
APPLICATION FILED APR. 24, 1902.
NO MODEL. 2 SHEETS—SHEET 1.
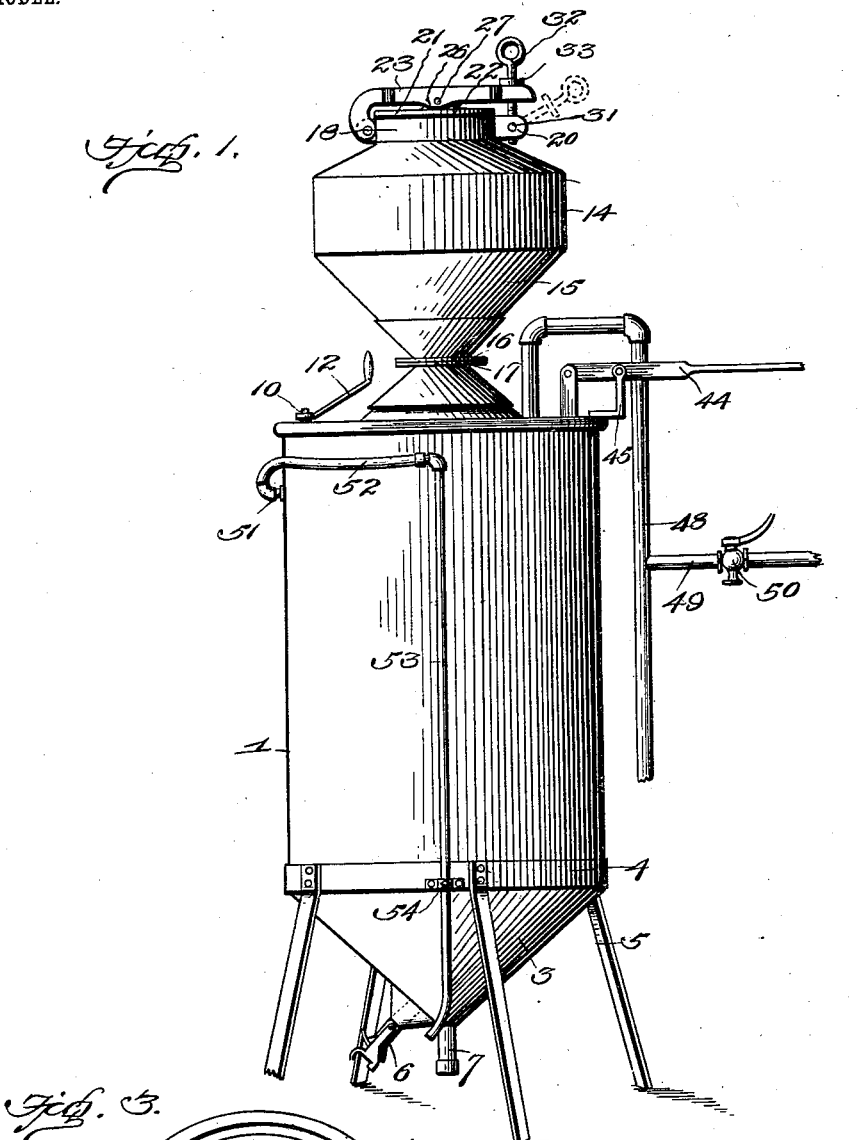
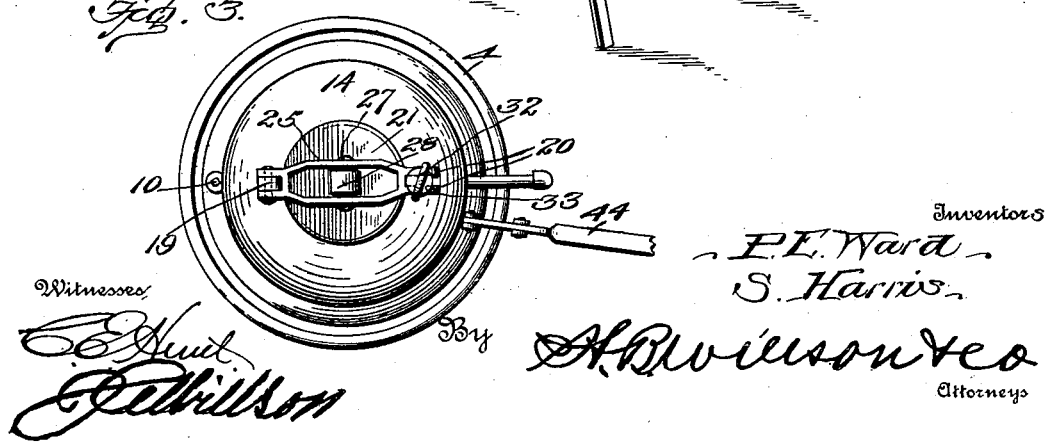

No. 742,935. PATENTED NOV. 3, 1903.
P. E. WARD & S. HARRIS.
ACETYLENE GAS GENERATOR.
APPLICATION FILED APR. 24, 1902.
NO MODEL. 2 SHEETS—SHEET 2.
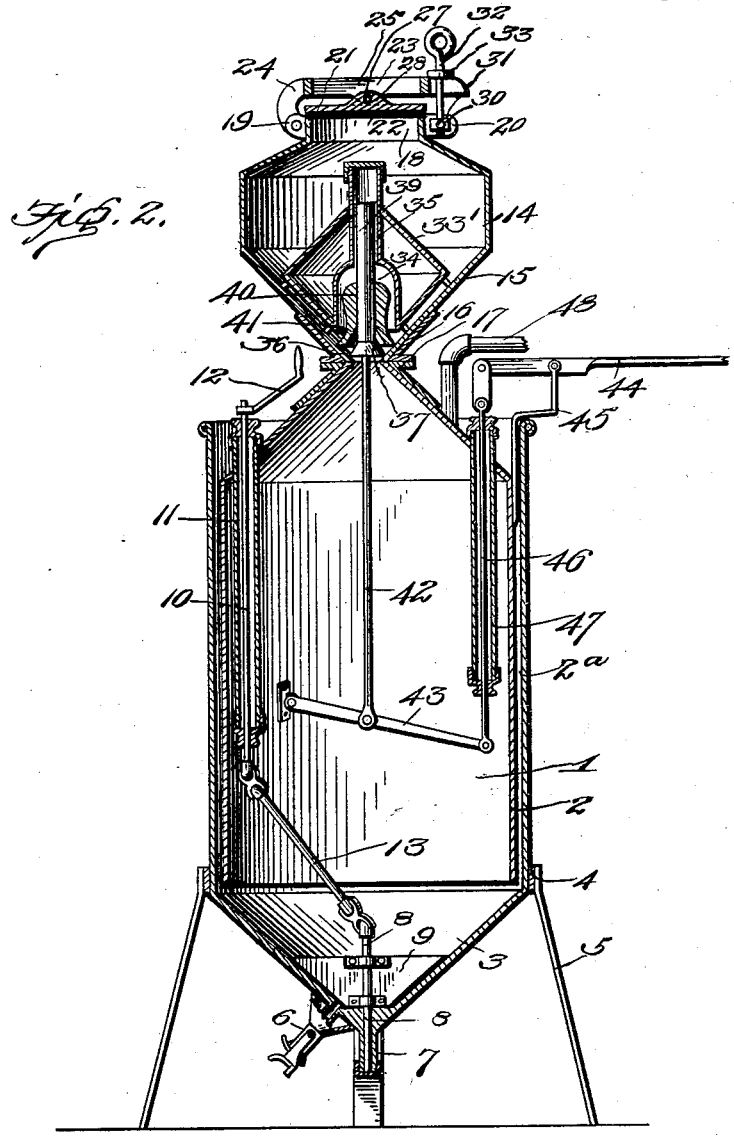
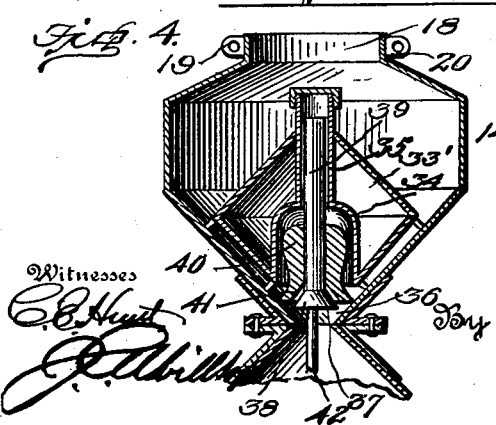
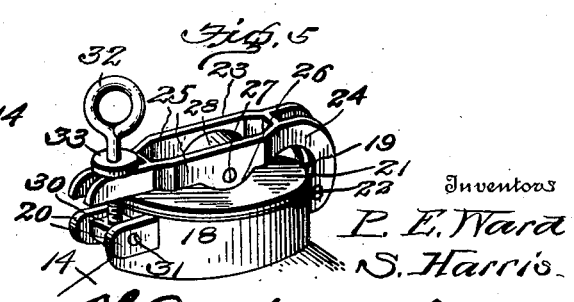

No. 742,935. Patented November 3, 1903.

UNITED STATES PATENT OFFICE.

PHILIP E. WARD AND SANGER HARRIS, OF KINGSTON, CANADA.

ACETYLENE-GAS GENERATOR.

SPECIFICATION forming part of Letters Patent No. 742,935, dated November 3, 1903.

Application filed April 24, 1902. Serial No. 104,529. (No model.)

*To all whom it may concern:*

Be it known that we, PHILIP E. WARD and SANGER HARRIS, subjects of the King of Great Britain, residing at Kingston, in the county of Frontenac and Province of Ontario, Canada, have invented certain new and useful Improvements in Acetylene-Gas Generators; and we do declare the following to be a full, clear, and exact description of the invention, such as will enable others skilled in the art to which it appertains to make and use the same.

The invention relates to acetylene-gas generators.

The object of the invention is to provide a generator of this character which shall be simple of construction, durable in use, and efficient and automatic in action and one which may be used with perfect safety.

With this and other objects in view the invention consists of certain novel features of construction, combination, and arrangement of parts, which will be hereinafter more fully described, and particularly pointed out in the appended claims.

In the accompanying drawings, Figure 1 is a side elevation of the generator. Fig. 2 is a longitudinal sectional view. Fig. 3 is a top plan view. Fig. 4 is an enlarged vertical sectional view through the carbid-controlling valve and the parts contiguous thereto, illustrating the primary cutting off of the supply of carbid before the valve has reached its seat; and Fig. 5 is a detail perspective view, on an enlarged scale, of the upper end of the carbid-holder, illustrating the manner of connecting the cover with the top of the holder.

Referring to the drawings, 1 denotes the generating-chamber, which consists of the inner and outer shells 2 and 2$^a$, the former of which has its lower end formed with a conical bottom 3 and is supported by a band 4, having legs 5. The conical bottom 3 is provided with a draw-off cock 6, and the conical bottom has a bearing-sleeve 7, within which is journaled a shaft 8, carrying a scraper or agitator 9.

10 denotes a vertical shaft fixed in the sleeve 11, carried by the upper conical end of the shell 2$^a$ and provided at one end with a crank or handle 12, by which it may be rotated. The lower end of the shaft 10 is connected to the shaft 8 by a link 13, the ends of which have a universal connection with said shafts 8 and 10, so that by turning the crank 12 the residuum may be loosened in the bottom of the generating-chamber and drawn off through the cock 6.

14 denotes the carbid-holder, having a tapering lower end 15 and an annular flange 16, which rests upon a straight flange 17, riveted to the upper conical end of the shell 2$^a$. These two flanges are riveted or bolted together, thus connecting the carbid-holder to the generating-chamber. The upper end of the carbid-holder is provided with an annular flange 18, which is formed on one side with a lug 19 and on the opposite side with parallel ears 20.

21 denotes a cap or top for the upper open end of the carbid-holder, and 22 a gasket to form an air-tight joint. A bar 23 has one of its ends formed with a lug 24, which is pivoted to the lug 19 and has its spaced-apart side pieces 25 formed with ears 26, which are adapted to bear centrally against the cap or cover 21 and hold it in locked position. If desired, a pin 27 may extend through the ears 26 and through a stud 28, formed on the cover or cap, so that when said bar is swung upwardly the cover will be elevated with it; but when pressure is applied upon said bar to close the cap or cover upon the carbid-holder said pressure is taken up by the ears 26 or by the ears and the bolt which connects the ears to the cap or cover.

30 denotes a nut having trunnions 31, which are journaled in the ears 20. 32 denotes a bolt threaded into said nut and having a collar 33, which is adapted to engage the upper edge of the bar between its spaced ends and securely clamp the bar with its cover. As shown in Fig. 1, the dotted lines indicate the position assumed by the bolt when it is moved to release the cover, while in full lines the position it assumes when the cover is locked. After moving it from the position shown in dotted lines to the position shown in full lines by giving the bolt a slight rotation the bar may be more firmly clamped to take up the wear.

Arranged within the carbid-holder is what we shall term a "carbid-support," which is formed of a double cone 33, having at its lower end a chamber 34 and carrying a guide-stem 35. This support is connected by bolts, rivets, or other means to the tapering sides of the carbid-holder and is spaced therefrom to permit the carbid to sift or pass between the interior walls of said carbid-holder and the exterior wall of the lower portion of the support and enter the generating-chamber. At the point of connection of the holder with the generating-chamber is provided a tapering valve-seat 36, with which engages a valve 37, having a sharp annular edge 38 to make a perfect contact with said seat. This valve is provided with a stem 39, which extends upwardly into the guide-stem 35 and has mounted upon it a weighted sleeve 40, which has an outwardly-flared lower end 41, which is adapted to engage the conical wall of the carbid-holder in a manner and for a purpose hereinafter described.

42 denotes a rod located within the generating-chamber and connected at its upper end to the valve and at its lower end to a pivoted lever 43.

44 denotes an actuating-lever pivoted to a bracket 45, secured to the generating-chamber and adapted to be connected to or operated by the bell of the gasometer. (Not shown.)

46 denotes a link connecting the lever 44 to the lever 43 and extending through a stuffing-box or seal 47. To open the valve 27, the outer end of the lever is depressed by the lowering of the bell of the gasometer. When the outer end of said lever is released or pressure removed therefrom, the combined weight of the valve, rod 42, lever 43, and link 46 will lower the valve to its seat, and thus cut off the supply of carbid to the generator.

48 denotes a pipe leading from the gas-space to the gasometer, and 49 denotes a vent-pipe provided with a cock 50 for a purpose hereinafter described.

51 denotes a water-outlet nipple mounted on the outside of the generating-chamber and connected to a flexible hose 52, which in turn is connected to a metal pipe 53, the lower end of which is held in vertical adjustment by a set-screw 54. By the employment of this device the water-level within the generating-chamber may be varied at pleasure. If the pipe 53 is elevated, the hose 52 will be bowed upward, thus raising the water-level within the generating-chamber, the difference equaling the distance between the nipple 51 and the highest point in the bow of the flexible tube.

In operation the carbid is placed within the holder, the bar swung down in place to lower the cap or cover in engagement with the upper end of the holder, and the screw swung upwardly and tightened. The valve is now operated to discharge a quantity of calcium carbid into the water contained within the generating-chamber. As the gas generates it passes out through the pipe 48 to the gasometer, and as the bell therein rises the outer end of the lever 44 is released, thus allowing the valve to close and cut off the supply of calcium carbid to the generating-chamber. In the closing of the valve it will be noticed by referring to Fig. 4 that the weighted sleeve which has been elevated by the valve 37 in its upward movement will first have its lower end come in contact with the tapering walls of the carbid-holder, and thus cut off the supply of calcium carbid at that point, so that in the further downward movement of the valve 37 that carbid which was passing from the holder at a point below the point of contact of the lower end of the sleeve with said holder has had a chance to escape and pass into the generating-chamber, thus permitting the valve 37 to snugly seat, which would not be the case were the valve in the act of seating brought into contact with the carbid as it flows from the holder to the generating-chamber. When it is desired to recharge the carbid-holder by raising the water-level within the generating-chamber to the top of the generating-chamber, all the gas within said chamber will be forced out through the pipe 48, or if the valve 50 is opened it will escape through the vent-pipe. After the carbid-holder has been charged, the cover fastened in place, the water-level within the generating-chamber may be lowered by lowering the pipe 53 and screwing it in place by the set-screw 54, thus leaving above the water within said generating-chamber a gas-space.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

1. In an acetylene-gas generator, the combination with a generating-chamber, and a carbid-holder, the latter having a downwardly-tapered bottom and a valve-seat in its lower side establishing communication between the carbid-holder and the generating-chamber, a double conical deflecting carbid-support in the carbid-holder and spaced from the downwardly-tapered side walls thereof, said carbid-support having the vertical guide 35 and the chamber 34 at the lower end thereof, a vertically-movable valve having an upwardly-projecting stem operating in the guide 35, said valve, when lowered, engaging the sides of and closing the valve-seat, and a weighted sleeve-valve above the first-mentioned valve, slidably connected to the stem thereof, movable upwardly to some extent thereby, disposed in the chamber 34, and normally engaging the valve-seat, substantially as described.

2. In an acetylene-gas generator, the combination with a generating-chamber and a carbid-holder, the latter having a downwardly-tapered bottom, and a valve-seat in its lower side establishing communication between the carbid-holder and the generating-chamber, a vertically-movable valve having an upwardly-extending stem, said valve when lowered engaging the sides of and closing the valve-seat, a weighted sleeve-valve, slidable on the valve-stem, above the valve, normally engaging the valve-seat above the valve and movable upwardly to some extent by the latter, and a double conical deflecting carbid-support in the carbid-holder, spaced from the downwardly-tapered side walls thereof, said deflecting carbid-support forming a guide for the stem of the valve and a housing for the weighted sleeve-valve, substantially as described.

In testimony whereof we have hereunto set our hands in presence of two subscribing witnesses.

PHILIP E. WARD.
SANGER HARRIS.

Witnesses:
I. A. BRECK,
JOSEPH BAWDEN.